N. J. OFSTAD.
FRUIT GRADER.
APPLICATION FILED JUNE 21, 1911.
1,030,479.
Patented June 25, 1912.
2 SHEETS—SHEET 2.
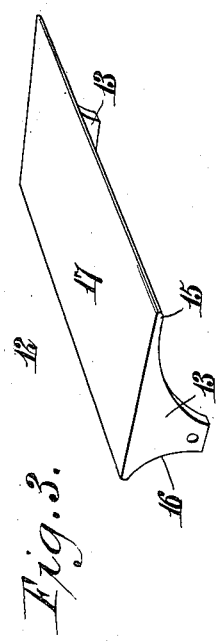
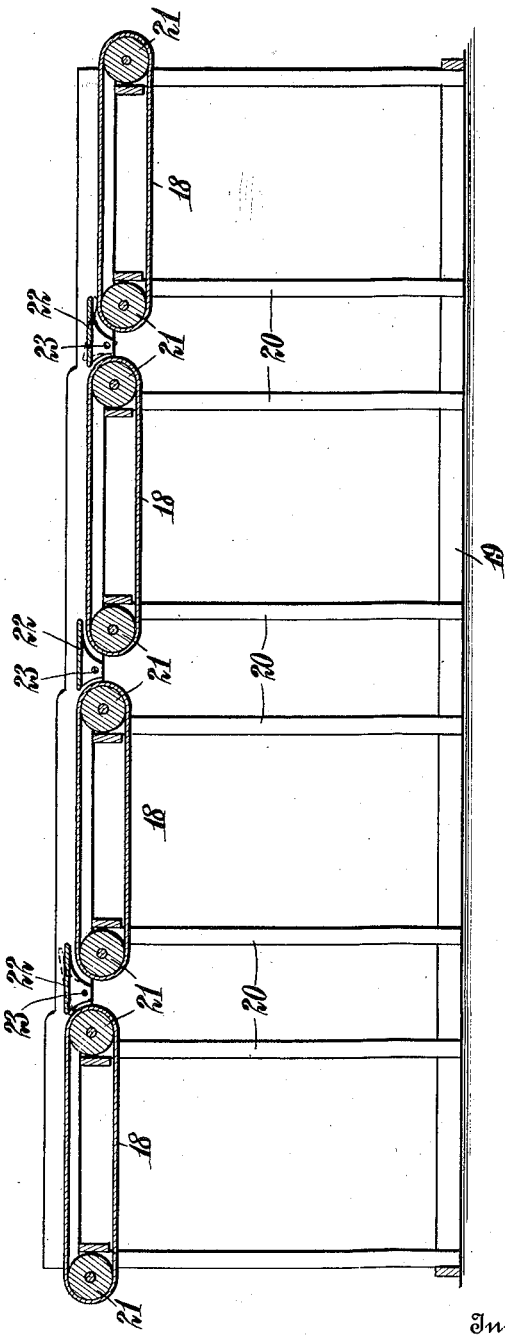

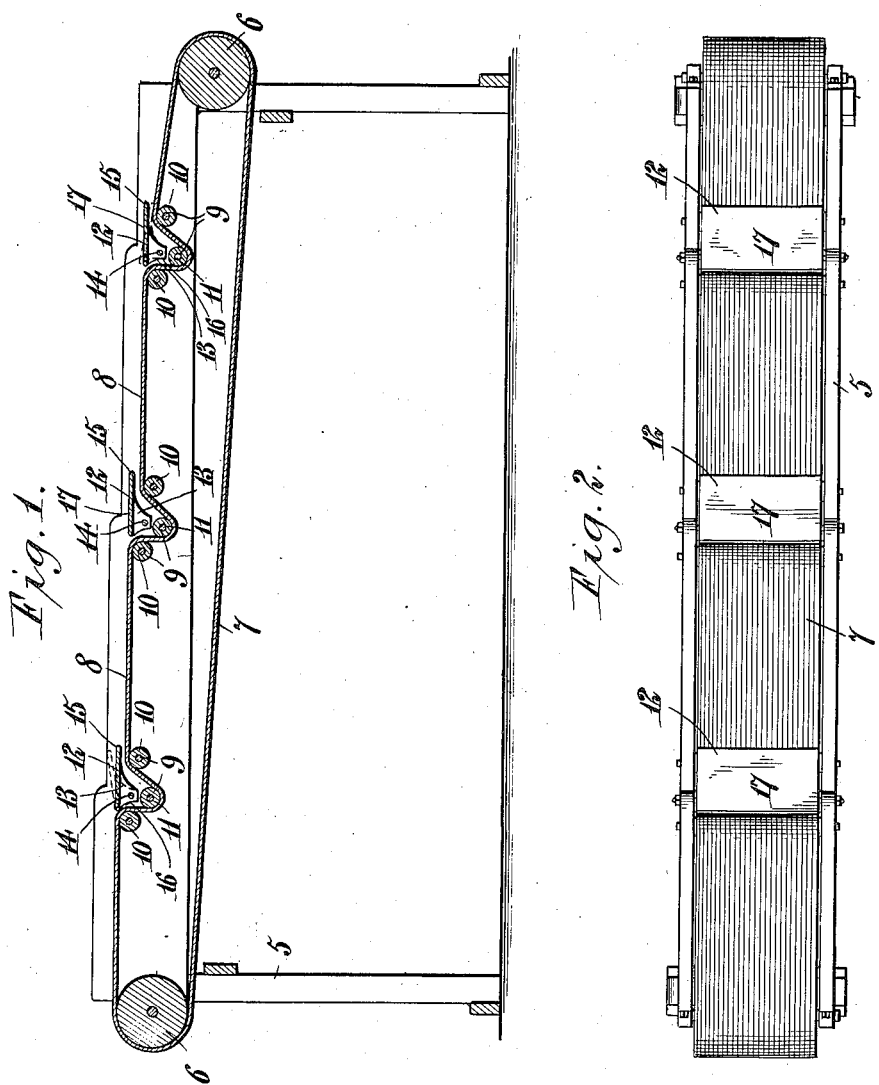

UNITED STATES PATENT OFFICE.

NICHOLAS J. OFSTAD, OF RIVERSIDE, CALIFORNIA.

FRUIT-GRADER.

1,030,479.　　　　Specification of Letters Patent.　　Patented June 25, 1912.

Application filed June 21, 1911. Serial No. 634,419.

*To all whom it may concern:*

Be it known that I, NICHOLAS J. OFSTAD, a citizen of the United States, residing at Riverside, in the county of Riverside and State of California, have invented new and useful Improvements in Fruit-Graders, of which the following is a specification.

The object of the invention is to facilitate the operation of grading fruit by causing the fruit, while being conveyed, to turn, so that the operator may observe the entire surface of the fruit.

The above and other objects will appear and be better understood from the following description taken in connection with the accompanying drawings in which:

Figure 1 is a vertical section of one embodiment of the invention; Fig. 2 is a plan of the same; Fig. 3 is a detail perspective of the fruit turner; Fig. 4 is a view similar to Fig. 1 but showing a modified form of the device.

The frame or casing 5 in Fig. 1 has suitable turning members such as drums or rolls 6 connected in any suitable manner (not shown) so as to be driven by suitable source of power not herein shown. An endless conveyer 7 is trained over the rolls or drums 6 and the surface of this conveyer is stepped and imperforate as shown at 8. In the embodiment shown in Fig. 1 the stepping is effected by a series of rolls 9. Each series is made up of a pair of upper rolls 10 arranged in spaced relation to each other and to a lower roll 11 underlying the space between the upper rolls 10. The conveyer 7 is trained over upper rolls 10 and under the lower roll 11. The fruit turners 12 are arranged in the spaces between the upper rolls 9 of each series. These fruit turners may be of any preferred construction and secured and supported in any preferred manner. In the present embodiment they are shown as having depending side portions 13 which may be adjustably secured in any preferred manner such as by the screws 14 to the opposite side walls of the frame or casing 5. The overhang portions 15 of the turners extend over the rollers therebelow, and one side of the depending portions 13 is curved as at 16 to conform to the curvature of the adjacent roller, whereby, to admit of adjusting the turners so that their plane upper surfaces 17 will, when desired, extend as shown by dotted lines in Fig. 1. It will be observed that the lower side of the overhang 15 is also curved so that the fruit turner may be adjusted to an inclined position opposite to that shown and just described.

In the modified form illustrated in Fig. 4 the conveyer is made up of a plurality of sections 18, and the casing 19 is interiorly divided into a plurality of sections by means of partitions 20. Each section has a pair of oppositely arranged rolls or drums 21 over which the conveyer 18 is trained. The succeeding conveyers are, however, in different horizontal planes, whereby, a stepped effect previously described in reference to Fig. 1, is effected. The fruit turners 22 are arranged in the spaces between the adjacent rolls of adjacent sections, the said turners being secured by any suitable fastening means such as the screws 23, whereby they may be adjusted to the positions previously described for Fig. 1. By referring to the drawing it will be seen that the upper faces of the fruit turners will be coextensive with the upper face of the conveyer when the said upper faces are horizontal, whereby, the velocity of the fruit passing over the turners will be substantially the same as the velocity of the conveyers. When, however, the turners are adjusted to the positions shown by dotted lines, the velocity of the fruit passing thereover will be increased or diminished with respect to the velocity of the conveyers.

In use the fruit is introduced by suitable mechanism onto one end of the conveyer and is moved thereby onto the first turner. It will be seen that when the fruit is on the conveyer it has no bodily movement with respect to the latter but when it passes onto the turner it will roll over the latter and onto the next conveyer where it will move with the same. While the fruit is rolling on the turner the operator may observe the entire surface of the fruit, whereby, damaged fruit may be readily detected and removed. In the event of the first operator's failing to remove damaged fruit due to his not seeing the defect when the fruit is caused to roll or turn by the first turner, the fruit will pass onto the next conveyer and when it reaches the next succeeding turner will be rolled or turned thereby so that the chances are that the succeeding operator may detect and remove the damaged fruit passed by the first operator. In the event of failure on the part of the second operator to detect damaged fruit passed by the first operator, the said damaged fruit will pass onto the third operator and so on for the entire number of operators employed, in which event it will be seen that damaged fruit must ultimately be discovered before it passes to the packer.

Although I have shown and described a preferred and modified form of the device it is to be understood that I am not to be limited to this specific showing and descriptions thereof since it will be readily seen that various changes may be made, in the scope of the appended claims, without departing from the spirit or sacrificing any of the advantages of the invention.

What is claimed as new is:

1. In a fruit grader, the combination with an imperforate endless conveyer; of fruit turning means located in the path of the conveyer and extending coextensive with one surface of the conveyer.

2. In a fruit grader, the combination with an endless conveyer; of adjustable fruit turning means located in the path and extending substantially coextensive with one surface of the conveyer.

3. In a fruit grader, the combination with an endless conveyer; of rigidly held adjustable fruit turning means located in the path of and extending substantially coextensive with the conveyer.

4. In a fruit grader, the combination with an endless conveyer having an interrupted surface; of stationary fruit turning means located in the path of the conveyer and in the break of the surface thereof.

5. In a fruit grader, the combination with an endless conveyer having a stepped surface; of adjustable fruit turning means located in the path of the conveyer and in the break of the surface thereof.

6. In a fruit grader, the combination with an endless conveyer having a stepped surface; of fruit turning means located at the juncture of said steps.

7. In a fruit grader, the combination with an endless conveyer having a stepped surface; of a fruit turning means located at the juncture of said steps, and adjustable to positions co-extensive with one of said steps and at an angle to either of said steps.

In testimony whereof I affix my signature in presence of two witnesses.

NICHOLAS J. OFSTAD.

Witnesses:
 FRANK R. COVEY,
 HENRY D. FRENCH.